Patented Sept. 21, 1943

2,329,809

UNITED STATES PATENT OFFICE 2,329,809

DYES OF THE ANTHRAQUINONE ACID WOOL DYESTUFF SERIES

Alexander J. Wuertz and David X. Klein, Wilmington, Del., assignors to E. I. du Pont de Nemours & Company, Wilmington, Del., a corporation of Delaware No Drawing. Application October 24, 1940, Serial No. 362,624

6 Claims. (Cl. 260—374)

This invention relates to the preparation of new dyes of the anthraquinone acid wool dye series and more particularly to the preparation of arylaminoanthraquinone sulfonic acids and their alkali metal salts which carry in the aryl ring the methylol (hydroxy methyl) radical,

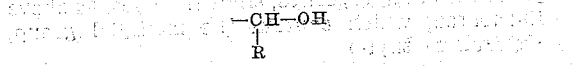

in which R stands for —CH₃ or —H.

One of the chief requirements of dyestuffs of the acid wool dyestuffs series is that they dye wool and related fibers in level shades, and this requirement is of particular importance where the dye is used in continuous piece goods dyeing. We have found that by introducing into the aryl-amino group of the arylaminoanthroquinone dye a methylol group, that is, one in which the hydroxy radical is directly attached to the first carbon of an aliphatic side chain on the aryl radical, dyestuffs of improved level dyeing properties are obtained which have fastness properties equal to the dyes of similar constitution which do not contain the methylol radical.

The following examples are given to illustrate the invention. The parts used are by weight.

Example 1

80.8 parts of bromamine acid 100%, (1-amino-4-bromo-2-anthraquinone sulfonic acid), 67.2 parts of sodium bicarbonate, 73.8 parts of ortho-amino-benzyl alcohol, 1200 parts of water, and 1.2 parts of copper sulfate.5H₂O, are heated to 75° C. and stirred for 12 hours at that temperature. On cooling a crystalline product separates. It is filtered off and the cake is charged into 3000 parts of hot water, and with stirring heated to 95–100° C. with 5 grams charcoal. The mass is then filtered from the small amount of insoluble material. 90 parts of salt are added to the filtrate which is heated to the boil. The color is precipitated as long crystals. The suspension is cooled to 25–30° C., filtered and the cake is washed with 3% brine and dried. The product dyes wool a clear, level blue from the usual acid dye bath.

Example 2

80.8 parts of bromamine acid 100%, (1-amino-4-bromo-2-anthraquinone sulfonic acid), 67.2 parts of sodium bicarbonate, 36.9 parts of meta-amino-benzyl alcohol, 900 parts of water and 1.2 parts of copper sulfate.5H₂O, are heated to 75° C. for 12 hours under agitation. The product is worked up as in Example 1, using 2% salt, (i. e. 60 parts) to isolate the color from the clarified solution, and the final cake is washed with 2% brine. The product is very similar in all properties to that of the product of Example 1.

Example 3

By substituting an identical quantity of para-amino-benzyl alcohol for the meta-amino-benzyl alcohol in Example 2, the reaction proceeds in a similar manner. In this case 5% salt is added after clarifying, and the cake is washed with 5% brine. The product is similar in all properties to that of Example 1.

Example 4

30.0 parts of bromamine acid 100%, 17.0 parts of 3-amino-4-methoxy-benzyl alcohol, 452 parts of water, 25.0 parts of sodium bicarbonate, and .5 part of copper sulfate.5H₂O are heated to 75° C. for 2 hours under agitation. The reaction starts below 50° C., and is almost complete at 75° C. The mass is cooled to 25–30° C. and filtered. The very crystalline product is boiled up with 3000 parts of water and .5 grams of charcoal. The solution is then filtered and 39 grams of salt are added to the filtrate heated at 90° C. It is then cooled to 25–30° C., filtered and the cake is washed with 1% brine and dried. The product dyes wool level greenish-blue shades.

Example 5

By substituting 17 parts of 5-amino-2-methoxy-benzyl alcohol for the 3-amino-4-methoxy-benzyl alcohol in Example 4, and working up in a similar manner, the isomeric color is obtained, which dyes wool level greenish-blue shades a trace brighter than that of Example 5.

Example 6

16.3 parts of bromamine acid, 240 parts of water, 20.8 parts of 1-amino-5-methylol-naphthalene, 13.4 parts of sodium bicarbonate, and .3 part of copper sulfate.5H₂O, are heated to 75° C. for 12 hours under agitation. The product is worked up as described in the above examples. The resulting product dyes wool clear greenish-blue shades.

Example 7

45.0 parts of 1-hydroxy-2-sulfo-4-bromo-anthraquinone copper salt, 37.0 parts of meta-amino-benzyl alcohol, 33.6 parts of sodium bicarbonate, and 607 parts of water, are heated to 75° C. for 12 hours with stirring. It is then cooled to room temperature and filtered. The cake is dissolved in 2000 parts of water containing 25 cc. of 20° Bé. hydrochloric acid. 80 parts of salt are added and the solution is stirred for one half hour and filtered. The cake is redissolved in 2000 parts of water to which 5 parts of charcoal have been added and boiled. The solution is filtered to remove a small quantity of insoluble material. 80 parts of salt are added to the filtrate, and the mass is stirred until cold. It is then filtered, and the cake is washed with 1000 parts of 4% brine containing 25 parts of 20° Bé. hydrochloric acid. The cake is then washed with 1000 parts of 4% brine and dried. The resulting color dyes wool a bright, level violet shade from the usual acid bath, which chromes to a dull, green shade.

*Example 8*

8.08 parts of bromamine acid (100%), 6.72 parts of sodium bicarbonate, 9.18 parts of 2:5-dimethylol-aniline, 120 parts of water, and .12 part of copper sulfate.5H$_2$O, are heated at 75° C. for 12 hours with stirring. On cooling 12 parts of sodium chloride are added and the solution is stirred until the dye is precipitated. It is then filtered and the cake is dissolved in 400 parts of hot water. 5 parts of charcoal are added and the solution is filtered to remove the small quantity of insoluble material. 20 parts of salt are added and the solution is cooled to 25° C. The crystals are filtered off, washed with 5% brine, then 2½% brine, then finally with 1% brine and dried. The resulting color dyes wool level blue shades.

*Example 9*

45 parts of 1-amino-4-bromo-5-hydroxy-2-anthraquinone sulfonic acid copper salt, 19 parts of meta-amino-benzyl alcohol, 33.6 parts of sodium bicarbonate and 607 parts of water are boiled under reflux for several hours. Dilute hydrochloric acid is added until the reaction is acid to Congo red. The solution is filtered at 25° C. The cake is heated with 1000 parts of hot water and 25 parts of concentrated hydrochloric acid, then filtered at 25° C. The cake is dissolved in 1000 parts of hot water, and sodium carbonate is added until the solution is slightly alkaline to Brilliant yellow indicator. Five parts of Darco are then added and the solution is filtered from the insoluble material. The filtrate is salted to 7½% salt concentration, cooled to 25° C. and filtered. The cake is washed with 5% brine and dried. The resulting color dyes wool bright greenish-blue shades, becoming duller and greener on top-chroming.

*Example 10*

40.0 parts of bromamine acid 100%, 20.5 parts of 2-methyl-5-methylol-aniline, 33.6 parts of sodium bicarbonate, 600 parts of water, and .5 part of copper sulfate.5H$_2$O, are heated at 75° C. for 12 hours under stirring. On cooling the color is filtered off and isolated as in Example 2. The resulting color dyes wool bright blue shades.

*Example 11*

4.04 parts of bromamine acid 100%, 2.03 parts of 3-amino-phenyl-methyl-carbinol, 3.36 parts of sodium bicarbonate, 40 parts of water, and .06 part of copper sulfate.5H$_2$O, are heated at 75° C. for 12 hours under agitation. The resulting color is worked up as in the above examples salting to 5% after clarification and washing with 3% brine. The color dyes wool bright, very level shades of blue.

The reactions of bromamine acid, its homologues and analogues, with amines are well-known, and the variations of time, temperature and proportions of reactants depend largely on the variation in the reactivity of the amino compound used. Temperatures from 45° to 100° C. are used while the amounts of the amine may be varied from 1.2 to 4 moles. The time required for carrying out the reaction may vary from one hour to twelve hours. The most suitable conditions to give maximum yields will vary and may be determined by simple experimentation in each case.

While in the above examples the colors are isolated as the alkali metal salts, (for potassium chloride may be used in place of sodium chloride) they may also be obtained in the form of the free sulfonic acids by the usual methods, such as by the acidification of a solution of the alkali metal salt.

Other anthraquinone sulfonic acids which will condense with arylamines, such as the quinizarine-5-(or 6) sulfonic acids; 1-methylamino-4-bromo-2-anthraquinone sulfonic acid, etc., may be condensed with the arylamines which carry the methylol group to produce colors with improved dyeing properties, since the dyes, as above illustrated, which contain the methylol group, (hydroxymethyl-)

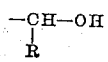

dye wool in more level shades than the corresponding compounds which do not contain that group, and are therefore of greater value, particularly for machine dyeing purposes.

These compounds particularly those prepared from the p-amino-benzyl alcohols also serve as intermediates in the preparation of other dyes of the type described in copending application of D. X. Klein, Serial No. 362,626, filed of even date herewith, for they are readily condensed with diarylamines in which one aryl group is of the benzene series and is unsubstituted in the para-position. The compounds of this application are also intermediates suitable for the preparation of cellulose acetate dyes by elimination of the sulfonic acid group as more particularly described in our copending application Ser. No. 362,625, filed of even date herewith.

We claim:

1. Compounds of the class consisting of arylaminoanthraquinone sulfonic acids and their alkali metal salts in which the aryl group is a monocyclic aryl radical, which carries in the aryl group the radical

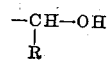

in which R represents a substituent of the group consisting of —CH$_3$ and —H.

2. Compounds of the class consisting of 1-amino-4-arylamino-2-anthraquinone sulfonic acids and their alkali metal salts in which the aryl group is a monocyclic aryl radical, which carries in the aryl group the radical

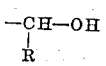

in which R represents a substituent of the class consisting of —CH$_3$ and —H.

3. Compounds of the class consisting or 1-amino-4-arylamino-2-anthraquinone sulfonic acids and their alkali metal salts in which the aryl group is a monocyclic aryl radical, which carries in the aryl group the radical —$CH_2$—OH.

4. 1-amino-4-(3'-hydroxymethylanilino)-2-anthraquinone sulfonic acid and its alkali metal salts.

5. 1-amino-4-(3'-hydroxymethyl-4'-methoxyanilino)-2-anthraquinone sulfonic acid and its alkali metal salts.

6. 1-amino-5-hydroxy-4-(3'-hydroxymethylanilino)-2-anthraquinone sulfonic acid and its alkali metal salts.

ALEXANDER J. WUERTZ.
DAVID X. KLEIN.